United States Patent

[11] 3,571,950

[72] Inventor Richard K. Walker
 3 Bradley Road, Convent, N.J. 07961
[21] Appl. No. 869,548
[22] Filed Oct. 27, 1969
[45] Patented Mar. 23, 1971

[54] TEACHING DEVICE
 6 Claims, 6 Drawing Figs.
[52] U.S. Cl. .................................................. 35/31
[51] Int. Cl. .................................................. G09b 19/02
[50] Field of Search .................................... 35/31, 9 (A)

[56] References Cited
UNITED STATES PATENTS
3,133,358 5/1964 Schramm ................... 35/31
3,504,449 4/1970 Kobler et al. ............... 35/31

Primary Examiner—W. H. Grieb
Attorney—George H. Fritzinger

ABSTRACT: A device for teaching arithmetic has two sockets for receiving numbered blocks and has a register with one indicator for showing the number or sum of numbers of the block or blocks inserted in the device and a second indicator for showing an equal quantity of items. A coupling mechanism between the blocks and the register comprises pushrods operated by the blocks according to their respective numbers and an intermediate plunger having a rock lever pivoted thereto which is operated by the pushrods to cause the plunger to be moved by one-half the sum of the movements of the respective pushrods. The register comprises two indicator tapes each wound on a pair of supply and takeup reels which are intercoupled and driven in synchronism to prevent any stress of the tapes.

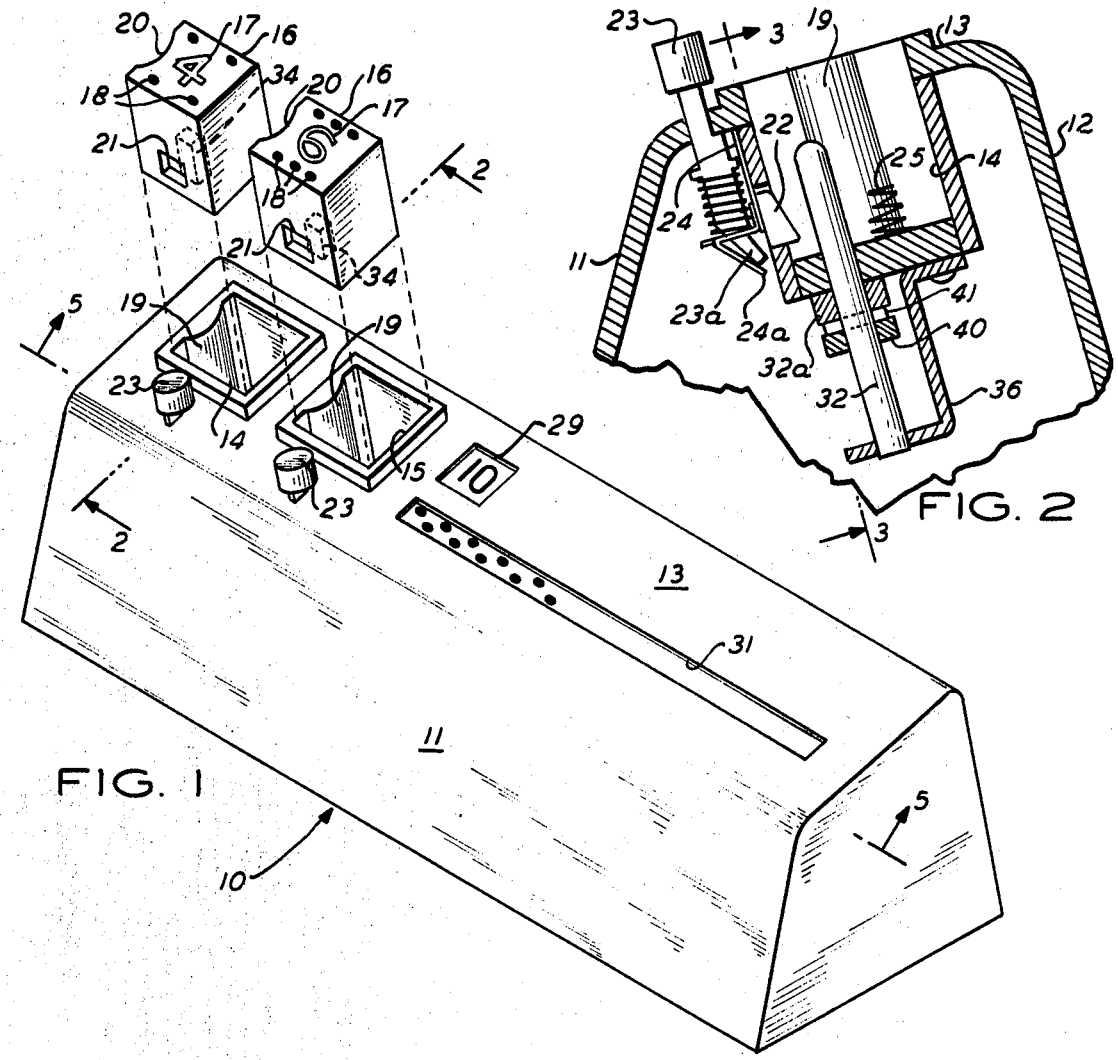
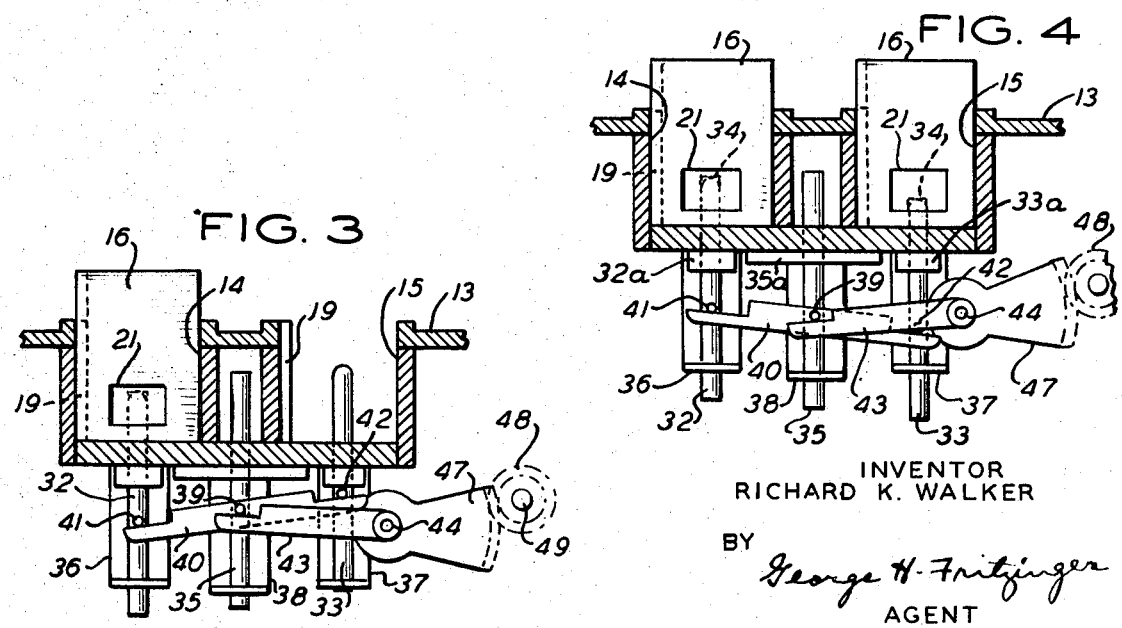

INVENTOR
RICHARD K. WALKER

BY George H. Fritzinger
AGENT

TEACHING DEVICE

An object of the invention is to provide a teaching device of the character above-mentioned which is accurate, dependable, easily operable and capable of withstanding impulsive insertion of the blocks in the sockets.

Another object is to provide an easily operable register for such teaching device which uses indicator tapes mounted on supply and takeup reels driven in synchronism to prevent any stress on the tapes.

Another object is to provide such teaching device wherein the operating and return forces during insertion and removal of the numbered blocks are applied free of the indicator tapes.

Another object is to provide a spring coupling between the blocks and the register which absorbs impulsive forces during block insertion and permits inertia over travel during block removal to keep stress on the indicator tapes to a minimum.

Another object is to provide such teaching device wherein the blocks are retained in mounted position by manually releasable latches to assure accurate operation of the register.

These and other objects and features of the invention will be apparent from the following description and the appended claims.

In the description of my invention reference is had to the accompanying drawings, of which:

FIG. 1 is a perspective view of the teaching device showing two blocks in positions extended from the respective mounting sockets;

FIG. 2 is a partial cross section on the line 2-2 of FIG. 1;

FIG. 3 is a cross section on the line 3-3 of FIG. 2 illustrating a positioning of the adding mechanism between the blocks and the register when only one block is mounted;

FIG. 4 is a cross section similar to FIG. 3 but illustrating a positioning of the adding mechanism when two blocks are mounted;

Figure 5:
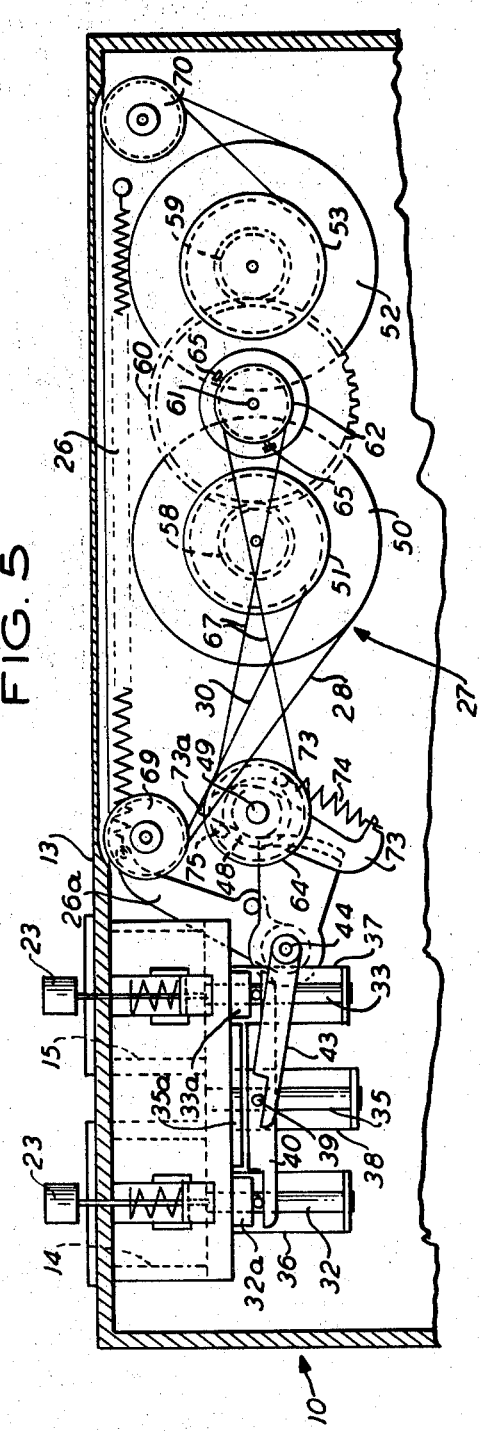
FIG. 5 is a longitudinal section through the teaching device on the line 5-5 of FIG. 1 showing the device in an unactuated condition.
Figure 6:
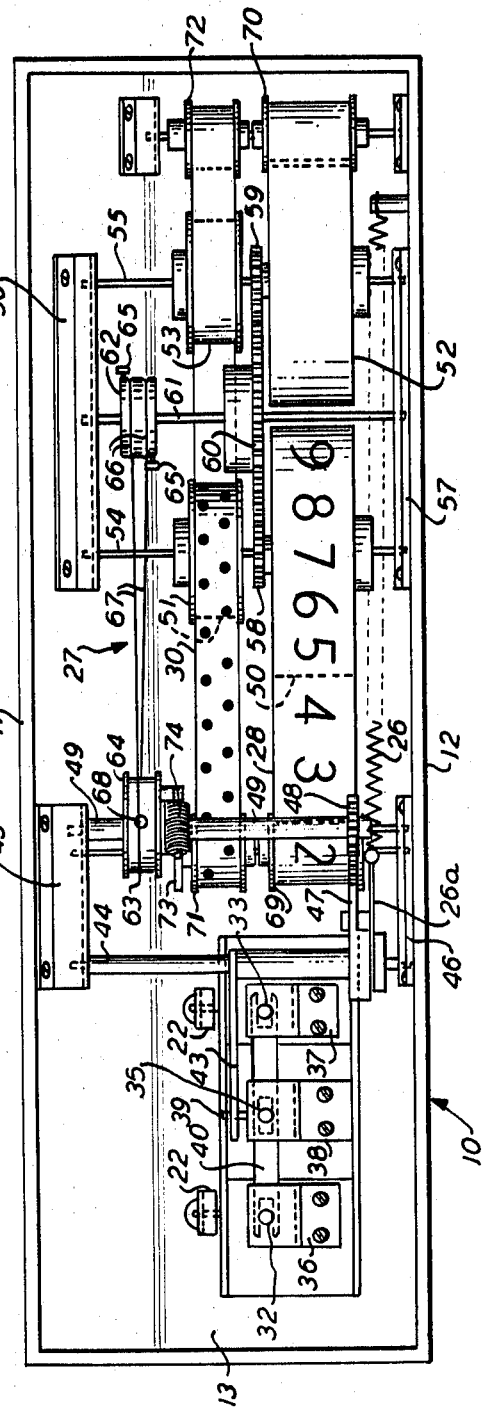
FIG. 6 is a bottom view of the teaching device.

The present teaching device has a housing 10 as of cast aluminum having slanting front and back walls 11 and 12 and a top wall 13 downwardly inclined to the front. In the left portion of the top wall there are two sockets 14 and 15 for receiving respective childrens' play blocks 16 as of the usual wood construction. The blocks are imprinted on their top faces with the numbers 17 as from 0 to 10 and with as many dots 18 as the respective number. An internal rib 19 on one sidewall of each socket and a corresponding groove 20 in a sidewall of the block enforces the child to orient the blocks so that the imprinting will face to the front before the block can be inserted. A notch 21 in the front sidewall of each block is engageable by a latch 22 projecting through the front wall of each socket to secure each block in a correct mounted position when the block is pressed to the bottom of the socket. Each latch is releasable by pressing a pushbutton 23 extending through the top wall 13 at the front of the respective sockets. The latch 22 may for example be carried by cantilever spring 24 normally holding it in latched position but which is moved to released position by operation of a cam face 23a against a tongue 24a as the button 23 is depressed. When the latch is released the block in the respective socket is raised by a compression spring 25 to permit the block to be then easily lifted out of the socket.

In the right portion of the housing 10 there is a register 27 having two indicator tapes of which one is a number tape 28 moved past a window 29 to show a number equal to that of the block inserted in either socket or equal to the sum of the numbers of the blocks inserted in both sockets. The other indicator tape is a "dot" tape 30 moved along a slot 31 to show a quantity of dots equal to the number appearing in the window 29.

The present invention resides in a novel and improved adding mechanism for actuating the register as the blocks are inserted into the sockets, and to an improved register which is of a stable and dependable construction.

The adding mechanism comprises two parallel pushrods 32 and 33 extending upwardly from the bottom of the respective sockets 14 and 15. The pushrods are positioned off from center of the sockets. Similarly, the blocks have offcenter holes 34 extending upwardly from the bottom faces thereof which are aligned with the respective pushrods when the blocks are oriented for insertion into the sockets. These holes have depths inversely proportional to the numbers on the blocks so that a pushrod is depressed to an extent proportional to the number on a block as the block is pressed into a latched position in a socket.

Midway between the pushrods in parallel relation thereto is a plunger rod 35. The pushrods 32 and 33 and the plunger 35 are slidably mounted in spaced bearings below the sockets of which there are respective upper bearings 32a, 33a and 35a and lower bearings constituted by the bottom legs of respective brackets 36, 37 and 38. The plunger 35 has a cross pin 39 between the upper and lower bearings thereof on which a rock lever 40 is pivoted. The opposite ends of the rock lever bear slidably against cross pins 41 and 42 in the pushrods 32 and 33 to hold the pushrods in raised position due to a force of a radial arm 43 bearing slidably against the cross pin 39 of the plunger. The radial arm 43 is secured to a drive shaft 44 for the register 27. This drive shaft is journaled at its ends in brackets 45 and 46 secured to the front and back walls 11 and 12 of the housing. The bias force on the radial arm 43 above mentioned is obtained from a return spring 26 connected between a pin on the housing and an arm 26a secured to the shaft 44 (FIG. 5).

Secured also to the drive shaft 44 is a gear sector 47 which meshes with a pinion 48 on an intermediate drive shaft 49 journaled also at its ends in the brackets 45 and 46. The gear sector 47 drives the pinion 48 in a 4 to 1 step-up ratio. The intermediate drive shaft 49 is coupled to the register 27 by a dial cord arrangement hereinafter described.

The register 27 comprises supply reels 50 and 51 for the number and dot tapes 28 and 30 respectively, and takeup reels 52 and 53 for these respective tapes. The supply and takeup reels are mounted on parallel shafts 54 and 55 journaled at their ends in brackets 56 and 57 on the front and back walls of the housing. Secured to the shafts 54 and 55 are pinions 58 and 59 of equal diameter which are intercoupled in 1 to 1 ratio by an intermediate gear 60 on a shaft 61 midway between the shafts 54 and 55. The shaft 61 is also journaled at its end in the brackets 56 and 57. Mounted on the shaft 61 is a dial cord pulley 62 coupled by a dial cord 63 to a drive pulley 64 on the pinion or intermediate drive shaft 49. The cord 63 is secured at its ends by screws 65 to the pulley 62 and leads from these screws in opposite directions partially around the pulley in channels 66 and then in crisscross runs 67 to the drive pulley 64. The cord leads one and one-half revolutions around the drive pulley and is secured midway of its convolutions on the drive pulley by a screw 68. Thus, a coupling is provided from the drive pulley to the register which is totally free of any possible slippage.

The supply and takeup reels 50 and 52 for the number tape are of equal diameter and so also are the supply and takeup reels 51 and 53 for the dot tape, but the reels for the number tape are twice as large in diameter as the reels for the dot tape so that the number tape will be driven at twice the speed of the dot tape. The numbered tape is led from the supply reel 50 around guide rollers 69 and 70 past the window 29. Likewise, the dot tape is led from the supply reel 51 around guide rollers 71 and 72 which direct an indicator run of the tape along the length of the slot 31. Each tape is secured at its ends to the respective supply and takeup reels in a state free of tension. Since the supply and takeup reels for each tape are equal in diameter and the reels are driven at equal speeds this free state of the tapes is maintained during the operation of the register. This permits the tapes to be made of light flexible plastic material. Further, the reels are made of lightweight foam plastic so that the register will have small inertia permitting it to be operated by small forces.

In order to prevent any shock actuation of the register from the intermediate drive shaft 49 such as could occur if a block were inserted quickly into a mounting socket with an impulsive force, a drive lever 73 is secured to the shaft 49 and coupled by a tension spring 74 to a side pin on the drive pulley 64 itself freely rotatably mounted on the shaft 49, and a second pin 75 on the pulley acts as a stop against an extension 73a of the arm 73 (FIG. 5). Thus, not only is an impulsive actuating force absorbed by the coupling spring 74 to prevent any shock actuation of the register but also when a block or the blocks are released from the mounting sockets the sudden return of the mechanism by the tension spring 26 to the point where the radial arm 43 is stopped by its abutment against the pin 39 on the plunger 35 will permit momentary inertia overthrow of the reels of the register to prevent any sudden stressing of the indicator tapes such as might be caused by any sudden stopping of the reels.

The operation of the present teaching device when a single block is inserted in a mounting socket is illustrated in FIG. 3 showing the rock lever tilted only in one direction from an effective pivot at its opposite end with a resultant movement of the plunger to approximately half the distance of the movement of the pushrod actuated by the block. This movement of the plunger is imparted via the radial arm 43 and gear sector 47 to the pinion 48 which rotates the intermediate drive shaft 49 to actuate the register so that it will show the number on the block inserted in the socket. When two blocks are inserted in the mounting sockets the rock lever 40 is actuated at both ends as illustrated in FIG. 4 causing now the plunger 35 to be actuated by a distance equal approximately to one-half the sum of the movements of the two pushrods 32 and 33. Again this movement of the plungers is imparted via the radial arm 43 and gear sector 47 to the pinion 48 to actuate the plunger as before described. Since the blocks have holes receiving the pushrods which are of a depth graduated according to the numbers on the blocks causing the pushrods to be actuated by distances corresponding to the numbers, the register is actuated to indicate the number of a single block or the sum of the numbers of both blocks inserted in the sockets. The improved coupling mechanism between the blocks and the register and the improved register which removes all stress from the indicator tapes assures a positive stable actuation of the register free of error and a dependable operation notwithstanding any impulsive insertion of a block into a mounting socket.

I claim:

1. A teaching device comprising a set of blocks having numbers thereon, a plurality of sockets for receiving said respective blocks in upright positions, each of said blocks having a recess extending from the bottom thereof which is dimensioned in proportion to the the number on the block, a pair of parallel pushrods extending upwardly into said sockets for engaging said recesses to cause the respective rods to be depressed by distances proportional to the numbers on the blocks as the blocks are inserted into said respective recesses, a rocker comprising a plunger midway between said pushrods in parallel relation thereto and a cross lever pivoted at its center to said plunger and bearing slidably at its end portions against said pushrods whereby said plunger is moved by approximately one-half the distance of movement of each pushrod, and a register coupled to said plunger to provide an indication according to the numbers on the respective blocks inserted into said sockets.

2. A teaching device comprising a plurality of sockets, a set of blocks bearing numbers thereon and insertable in upright positions in said respective sockets, a plunger, means associated with said sockets and engageable with said blocks as the blocks are inserted in said sockets for actuating said plunger according to the numbers on the blocks inserted into the sockets, and a register operated by said plunger comprising a pair of parallel shafts, supply and takeup reels on said respective shafts, a tape wound on said reels having an indicator run between the reels bearing indicia, a gear train between said reels for synchronizing the reels with each other whereby the tape is unwound from one reel to the other without undergoing stress, and means coupling said plunger to said gear train for causing said tape indicator run to be moved according to the numbers on the respective blocks inserted into said sockets.

3. The teaching device set forth in claim 2 including a yieldable member in said coupling means between said plunger and gear train for absorbing any shock actuation of said plunger caused by a sudden driving insertion of a block into one of said sockets.

4. The teaching device set forth in claim 2 including a tension spring connected to a portion of said coupling means for biasing said plunger and register into start positions.

5. The teaching device set forth in claim 2 wherein said coupling means comprises a crank shaft operated by said plunger, a second shaft journaled parallel to said crank shaft, a gear segment and pinion coupling said crank shaft to said second shaft, pulleys on said second shaft and on an intermediate gear of said gear train respectively, and a dial cord intercoupling said pulleys having portions secured rigidly to the pulleys to prevent slippage relative thereto.

6. The teaching device set forth in claim 2 including a housing and wherein said register includes a second pair of supply and takeup reels on said pair of shafts, a tape wound on said second pair of reels and having an indicator run therebetween bearing indicia, the indicia on one of said tapes bearing numbers and on the other of said tapes being a series of individual marks, and said housing having a window to render visible successive numbers on said one tape as the register is actuated and having an elongate slot to expose a quantity of said individual marks corresponding to the number appearing in said window, and manually releasable means on said housing for latching said blocks in mounted positions in said respective sockets.